United States Patent
Barton

(10) Patent No.: US 9,374,326 B2
(45) Date of Patent: Jun. 21, 2016

(54) PROVIDING INFORMATION FOR SHARED CONTENT

(71) Applicant: Dropbox, Inc., San Francisco, CA (US)

(72) Inventor: Chris Barton, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 391 days.

(21) Appl. No.: 13/900,989

(22) Filed: May 23, 2013

(65) Prior Publication Data
US 2014/0351346 A1    Nov. 27, 2014

(51) Int. Cl.
*H04L 29/06* (2006.01)
*H04L 12/58* (2006.01)

(52) U.S. Cl.
CPC ............... *H04L 51/00* (2013.01); *H04L 51/24* (2013.01); *H04L 65/4038* (2013.01)

(58) Field of Classification Search
CPC ........ H04L 51/00; H04L 51/24; H04L 65/403
USPC ................................................ 709/204, 206
See application file for complete search history.

(56) References Cited

U.S. PATENT DOCUMENTS

| | | | | |
|---|---|---|---|---|
| 2002/0046188 A1* | 4/2002 | Burges | ............... | G06Q 20/3674 705/67 |
| 2003/0225834 A1* | 12/2003 | Lee | ............... | G06Q 10/107 709/204 |
| 2009/0125522 A1* | 5/2009 | Kodama | ............ | G06F 17/30165 |
| 2013/0067594 A1* | 3/2013 | Kantor | ................ | G06F 21/6218 726/28 |
| 2013/0110925 A1* | 5/2013 | Wessling | ............. | G06Q 10/109 709/204 |
| 2014/0122592 A1* | 5/2014 | Houston | ............. | H04L 67/1095 709/204 |
| 2014/0304618 A1* | 10/2014 | Carriero | .............. | H04L 12/1818 715/753 |

* cited by examiner

*Primary Examiner* — Alina N Boutah
(74) *Attorney, Agent, or Firm* — Polsinelli PC

(57) ABSTRACT

Various embodiments can enable a content item associated with a sharer account of a content management system to be shared with a recipient account of the content management system. The content item can be analyzed to determine at least some information about the content item, which can include one or more properties associated with the content item, one or more representations of one or more content portions present in the content item, or any combination thereof. A communication can notify the recipient account that the sharer account has shared the content item with the recipient account. The communication can further comprise the determined information about the content item, which can include the one or more properties and/or the one or more representations of the content portions. This information can enable the recipient to make a better decision regarding whether or not to accept the share invitation.

19 Claims, 12 Drawing Sheets

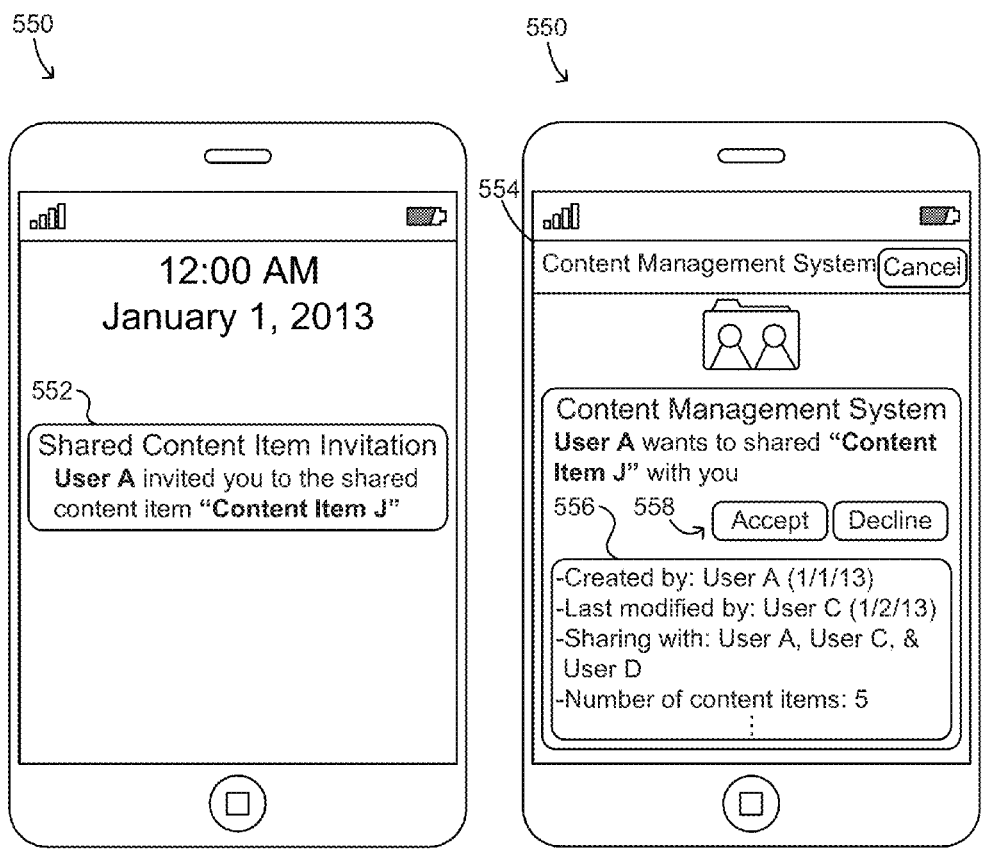

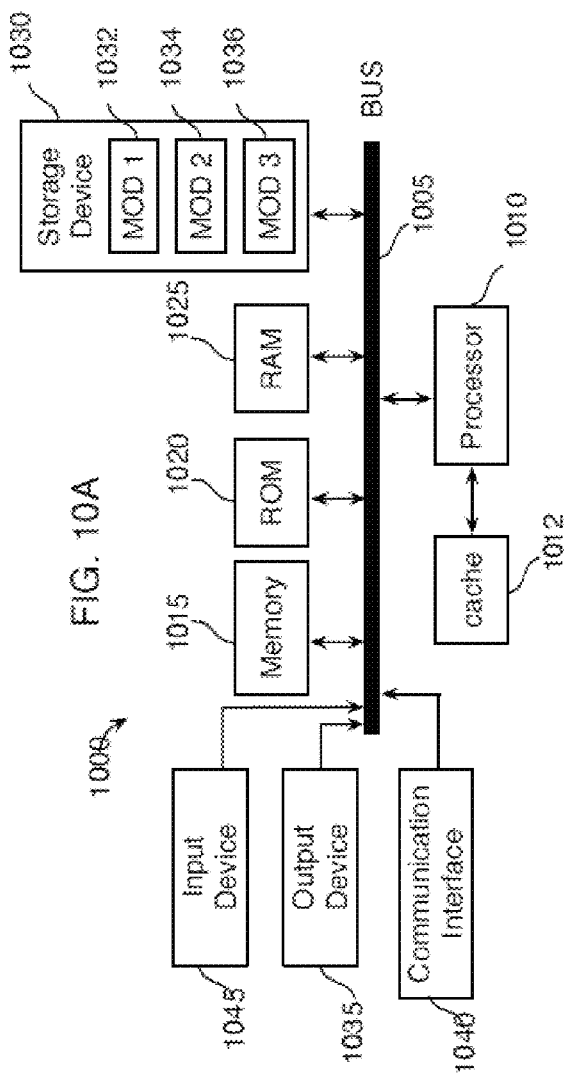
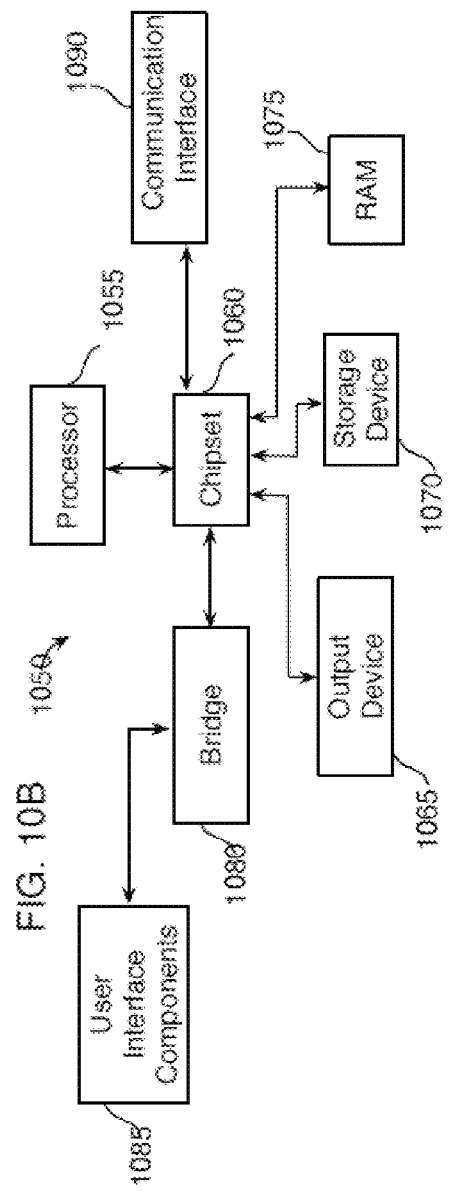
FIG. 10A
FIG. 10B

PROVIDING INFORMATION FOR SHARED CONTENT

TECHNICAL FIELD

The present technology pertains to shared content, and more specifically pertains to providing information about shared content.

BACKGROUND

Online content storage is becoming more popular. People frequently store, access, or otherwise interact with content stored at online content management systems. Documents, pictures, music, videos, directories, folders, and other types of content items can be stored at online content management systems to be accessed by users of the online content management systems. In some cases, a content item can be shared by one user with another user(s) via an online content management system.

For example, a first entity can store a collection(s) of content items (e.g., a directory(ies), a document(s) within a directory(ies), a photo album, a media playlist, files, data, etc.) at the first entity's account with an online content management system. In other words, the first entity can be the "owner" of the collection(s) of content items. In one example, the first entity (i.e., owner) can decide to share a content item with one or more other entities (also known as "recipients") via the online content management system. In this example, the first entity can also be known as a "sharer" of the content item. The recipients can choose whether or not to accept the sharing of the content item. In some cases, if the recipients accept the sharing of the content item, then the recipients can download the content item via the online content management system and the content item can be synced among the sharer (e.g., owner) account and the recipient accounts. As such, if any one of the sharer and/or the recipients modifies the shared content item, then the modification(s) made to the shared content item will be updated (i.e., reflected, take place, etc.) at each of the sharer account and/or the recipient accounts.

In some cases, a recipient may have a difficult time deciding whether or not to accept shared content. For example, the recipient might not know much about the content item (e.g., a directory) and/or other sub-level content items within the content item (e.g., files within the directory). The content item might not be sufficiently relevant with respect to the recipient's perspective. In another example, the recipient might not know whether accepting (and thus downloading) the shared content would use up too much memory (e.g., storage space, hard disk space, etc.) at the recipient's online content management system account and/or computing device. These and other concerns can create challenges for the overall user experience associated with sharing content via online content management systems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing information about content shared via an online content management system. In some embodiments, a user of the online content management system can store data, such as collections of content items (e.g., directories, files, albums, playlists, etc.), at the online content management system. The user can be considered the "owner" of the collections of content items. The owner can share one or more of his content items with one or more other users, such that the content items can be synced among the owner and the other users with whom the content items are shared. In this case, it follows that the owner can also be known as the "sharer" and the one or more other users can also be known as the "recipients."

In one example, one or more content items associated with a content management system account of the sharer can be shared with a content management system account of a recipient. The content management system can process the content item to be shared. For example, the content management system can analyze one or more content portions of the content item and/or other data associated with the content item. The content management system can determine at least some information about the content item based on the processing or analyzing. In one example, the content management system can determine one or more properties associated with the content item, one or more representations of one or more content portions present in the content item, or any combination thereof.

Continuing with the example, the content management system can transmit a communication notifying the recipient account that the sharer account has shared the content item with the recipient account. The communication can also include the determined information about the content item, which can correspond to the one or more properties of the content item and/or the one or more representations of the content portions of the content item. This information can enable the recipient to make an informed decision or at least a relatively better decision regarding whether or not the recipient would likely be interested in the shared content item. If the recipient so chooses, the recipient can accept the share invitation and access the shared content item.

It is important to note that the various embodiments and/or examples discussed herein are for illustrative purposes only. A person having ordinary skill in the art would recognize various other manners or approaches that can be utilized consistent with the scope of the present disclosure. Various other functions and advantages are described and suggested below as may be provided in accordance with the various embodiments.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5B shows an exemplary computing device embodiment at which information about a shared content item can be provided;

FIG. 5C shows an exemplary computing device embodiment at which information about a shared content item can be provided;

FIG. 10A shows an exemplary possible system embodiment for implementing various embodiments of the present technology; and FIG. 10B shows an exemplary possible system embodiment for implementing various embodiments of the present technology.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for providing information about content shared via a content management system. Various embodiments of the disclosed technology can enable a content item associated with a sharer account of the content management system to be shared with a recipient account of the content management system. The content item can be analyzed to determine at least some information about the content item, which can include one or more properties associated with the content item, one or more representations of one or more content portions present in the content item, or any combination thereof. A communication can notify the recipient account that the sharer account has shared the content item with the recipient account. The communication can further comprise the determined information about the content item, which can include the one or more properties and/or the one or more representations of the content portions. This information can enable the recipient to make a better decision regarding whether or not to accept the share invitation.

Figure 1:
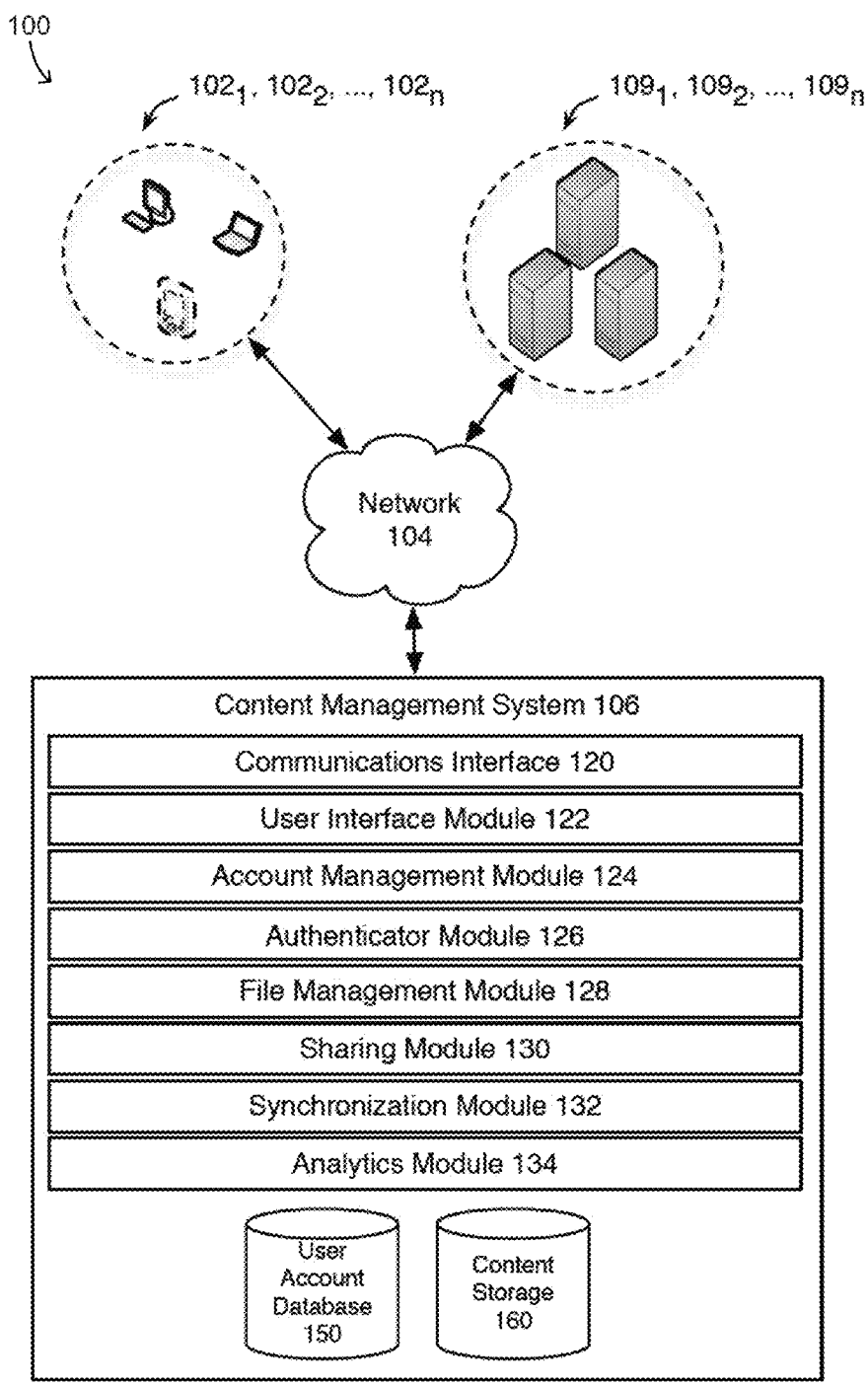
FIG. 1 shows an exemplary configuration of devices and a network in accordance with the invention.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
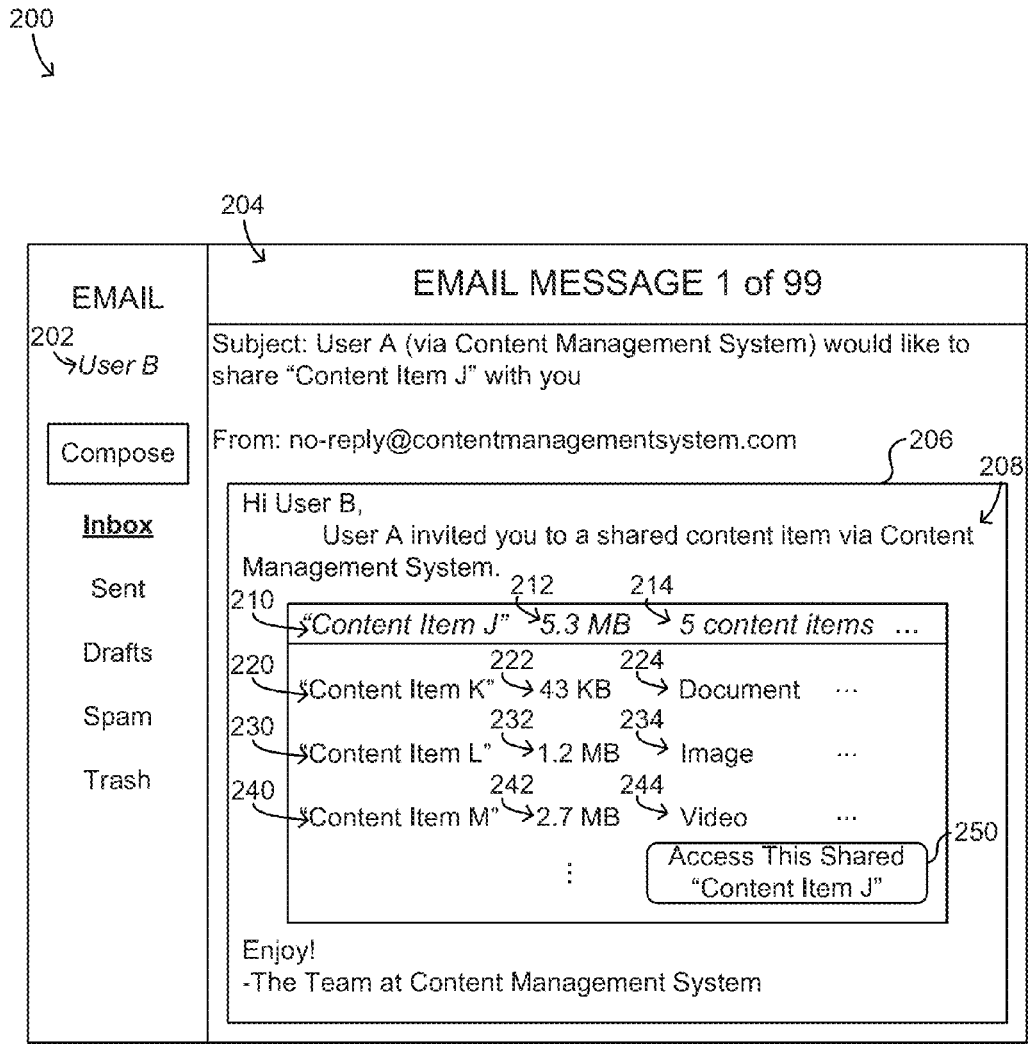
FIG. 2 shows an exemplary interface through which information about a shared content item can be provided.

With reference now to FIG. 2, FIG. 2 shows an exemplary interface through which information about a shared content item can be provided. Exemplary interface 200 can include an interface for an electronic mailing (i.e., email) system. In the example of FIG. 2, User B 202 can sign into User B's account with the email system. The email system can allow User B 202 to send and/or receive email messages.

In one example, User A of an online content management system (e.g., content management system 106 in FIG. 1) can send a shared content item invitation to User B 202 via the online content management system. In other words, User A can make a request to the online content management system to share one or more of his content items with User B 202. The online content management system can receive User A's request and cause an email message to be transmitted to an email account associated with User B's content management system account. As shown in the example of FIG. 2, email message 204 can be transmitted by the content management system and received by User B's email account. In the example, email message 204 can include message content 206.

Conventional approaches generally notify a recipient user that a file/folder has been shared with the recipient. However, various embodiments of the present disclosure enable much more detail or additional information to be provided to recipients of the shared content. Continuing with the example of FIG. 2, email message content 206 not only includes a message 208 notifying User B 202 that User A has shared a content item with User B 202 via the content management system, but message content 206 also provides various kinds of information about the shared content item, such as one or more properties or details of the shared content item. For example, the various information can include (but is not limited to) the name of the shared content item (e.g., 210), the size of the shared content item (e.g., 212), the quantity (e.g., 214) of sub-level content items (if any) included within Content Item J 210, the names (e.g., 220, 230, 240) of the sub-level content items, the sizes (e.g., 222, 232, 242) of the sub-level content items, and/or the content types (e.g., 224, 234, 244) for the sub-level content items.

In the example of FIG. 2, Content Item J 210 can be a shared directory (e.g., folder). Message content 206 can indicate that Content Item K 220 is a sub-level content item within Content Item J 210 (e.g., a file within a folder). Message content 206 can indicate that Content Item K 220 is 43 KB (222) in size and has a content type (e.g., file type, file format) of "document" (224), such as a word processing document, text, or a portable document format (PDF). Further, Content Item L 230 can be a 1.2 MB (232) image (234) content item within Content Item J 210. Moreover, Content Item M 240 can be a 2.7 MB (242) video (244) content item within Content Item J 210. Accordingly, User B 202 can make an informed decision, or at least a relatively better decision, regarding whether or not to accept the shared content invitation from User A.

In one example, perhaps User A and User B 202 went to an event together and User B might have been expecting media and other files related to the event from User A. Although the shared content item is labeled as "Content Item J" 210 in FIG. 2, this is just for explanatory purposes. In this example, shared content item 210 could instead have been be labeled "Press Meeting on Jan. 1, 2013." Similarly, content item 220 could have been named "Minutes". Content item 230 could have been called "User A & User B Photo" Likewise, content item 240 could have been identified as "Press meeting video recording". This and other information can allow User B 202 to better determine how relevant the shared content is, with respect to User B 202. Thus User B 202 can better decide whether or not he should accept and/or access the shared content (e.g., via button/link 250).

In some embodiments, the information about the shared content item can be received or obtained (e.g., downloaded) at a time when the recipient user accesses (e.g., views, opens, etc.) the email message. As such, the information about the shared content item provided to the recipient user can be with respect to the most recent version of the shared content item (e.g., incorporating any modifications to the shared content item between the time the email message was sent and the time when the recipient user accesses the email message).

Figure 3A:
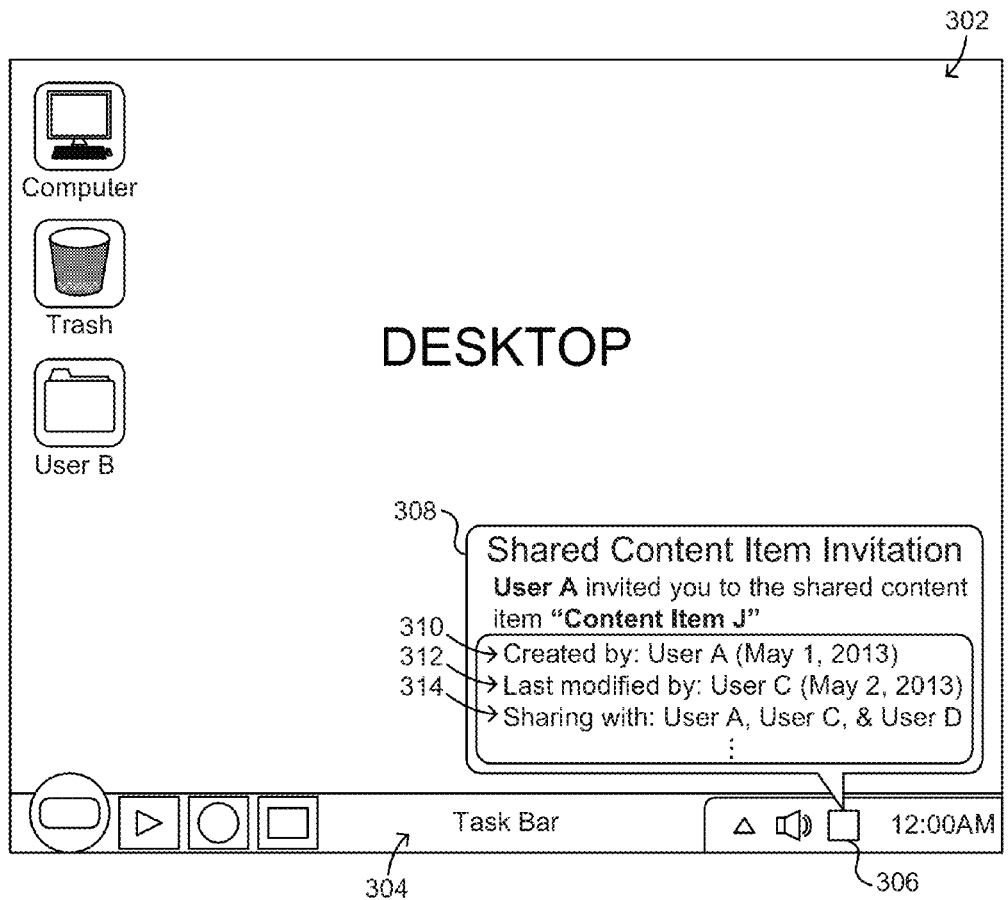
FIG. 3A shows an exemplary client application through which information about a shared content item can be provided.

FIG. 3A shows an exemplary client application through which information about a shared content item can be provided. In the example of FIG. 3A, there can be one or more interfaces, such as desktop 302 and/or task bar 304 provided by an operating system of a computing device. In this example, the computing device, such as a desktop or notebook computer, can be associated with User B. The computing device can be running an application compatible with a content management system (e.g., 106 in FIG. 1). In FIG. 3A, the client application can be represented by icon 306 displayed in task bar 304. In some embodiments, the application (i.e., client application, desktop application, etc.) can be configured to work in conjunction with the content management system to sync User B's data stored locally at the computing device with data stored at User B's account at the content management system. As such, User B's local collections of content items can be synced with those at his account at the content management system, and vice versa.

In one example, User A can invite User B to a shared content item. In this example, User A can transmit the invite to the content management system. The content management system can, in response, send a communication to User B via the client application running on the computing device of User B. Based on the communication, the client application can present notification 308 or another indicator to User B. For example, notification 308 can include a message indicating that User A has shared a content item with User B. However, not only does notification 308 indicate that User A has shared the content item, but notification 308 can also provide details or other information about the shared content item.

As shown in FIG. 3A, notification 308 can provide information including one or more properties of the shared content item. For example, notification 308 can specify the name of the sharer (User A) and the name of the shared content item ("Content Item J"). Notification 308 can also specify Content Item J's creator or author (User A) and when Content Item J was created or authored (May 1, 2013), as shown in element 310. Notification 308 can also state, for example, who most recently modified Content Item J (User C) and when (May 2, 2013), as shown in element 312. Further, notification 308 can indicate one or more user accounts (e.g., User A, User C, User D) with which Content Item J has been shared, as shown in element 314. It is also contemplated that notification 308 can provide various other information about the shared content item.

Continuing with the example, these pieces of information (e.g., 310, 312, 314, etc.) can allow User B to better gauge how interested he would be in Content Item J. In some embodiments, if User B so chooses, he can accept User A's share invite and access Content Item J by interacting with (e.g., clicking on, hovering over, etc.) notification 308. In some embodiments, User B can accept the share invite and access Content Item J by interacting with icon 306, which, as previously mentioned, can be a representation of the client application for the content management system.

Figure 3B:
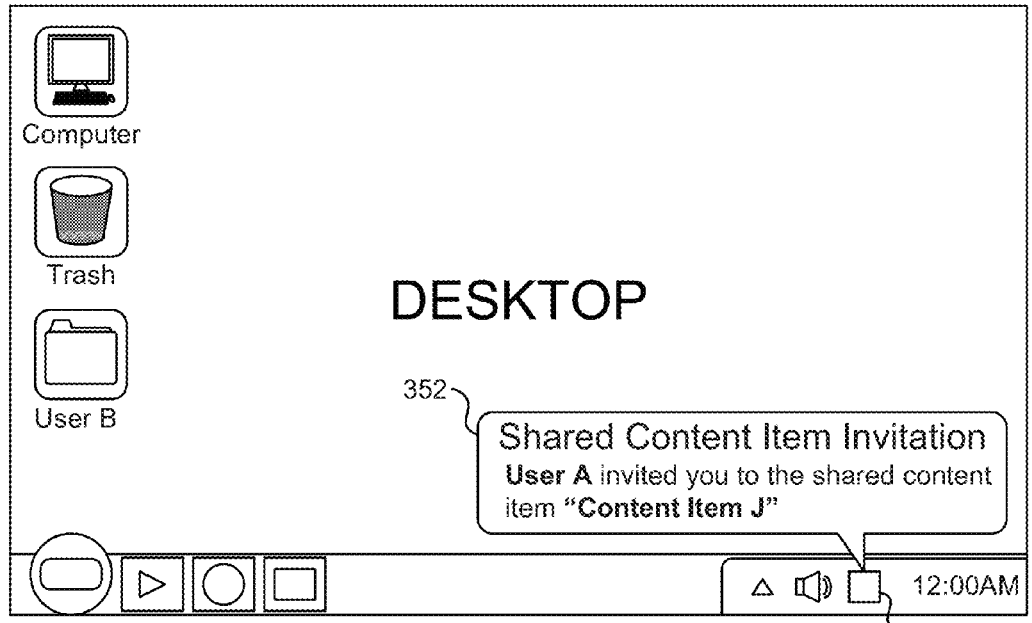
FIG. 3B shows an exemplary client application through which information about a shared content item can be provided.
Figure 3C:
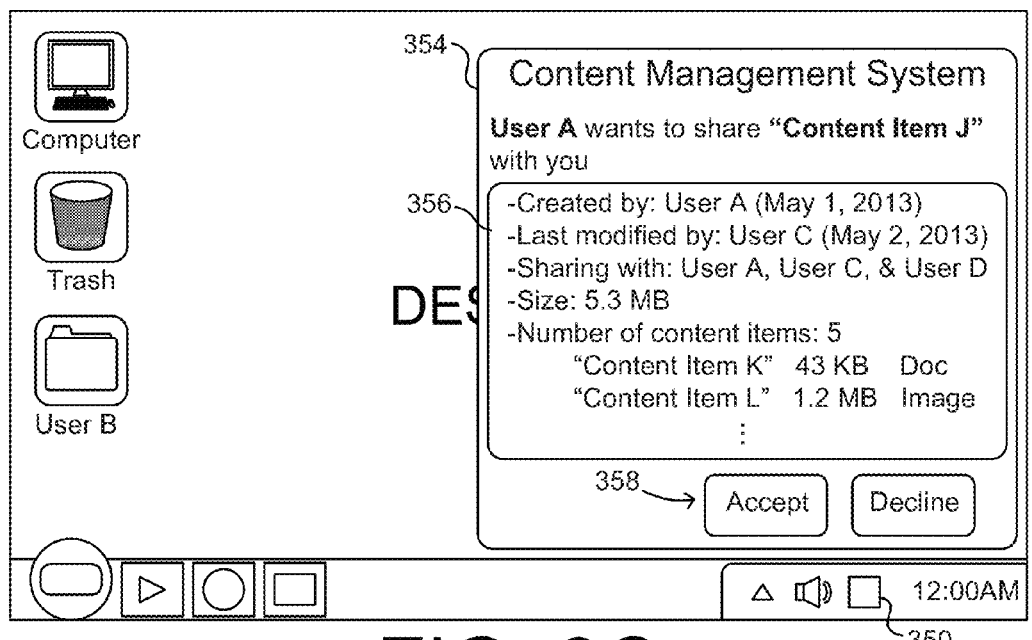
FIG. 3C shows an exemplary client application through which information about a shared content item can be provided.

FIG. 3B and FIG. 3C show an exemplary client application through which information about a shared content item can be provided. In FIG. 3B and FIG. 3C, a computing device can be running an application, represented in the task bar by icon 350. The application (i.e., client application, desktop application, etc.) can be compatible with a content management system. In FIG. 3B, the client application can display notification 352 which indicates to User B that User A has invited User B to shared content ("Content Item J"). In some embodiments, in order to save display space, reduce distractions, etc., additional information about the shared content need not be displayed in notification 352. In some cases, User B can interact with (e.g., click on, hover over, etc.) notification 352 to cause window 354 to be displayed by the client application, as shown in FIG. 3C.

In addition to notification 352 of FIG. 3B, window 354 of FIG. 3C can further provide information 356 about shared Content Item J. Furthermore, window 354 can provide option 358 to accept or decline the share invitation from User A with respect to Content Item J.

In some embodiments, the client application can be running while the computing device is in an active state (e.g., powered on, logged in, not in sleep-mode, not in hibernation-mode, etc.) and capable of communicating with the content management system (e.g., connect to a network such as the Internet). As such, notifications can be provided by the client application in real-time (i.e., within an allowable time period) relative to when User A initiates the share invitation via the content management system.

Also, in some embodiments, when a sharer or other sharing member of a content item revises, edits, or otherwise modifies the shared content item before a recipient user accepts the share invite, the content management system can cause information about the revision, edit, or modification to be provided to the recipient user. In one example, if the sharer or other sharing member adds a new file to a shared directory, the size of the shared directory can increase. Information about this size increase can be provided to the recipient user. For example, the content management system can cause the information about the size increase to be presented to the recipient user via notification 308 in FIG. 3A, notification 352 in FIG. 3B, and/or window 354 in FIG. 3C. Therefore, providing information about shared content items can be a dynamic process, for example, such that if the recipient user views a notification (or window or communication) more than once, the information provided can change.

Figure 4:
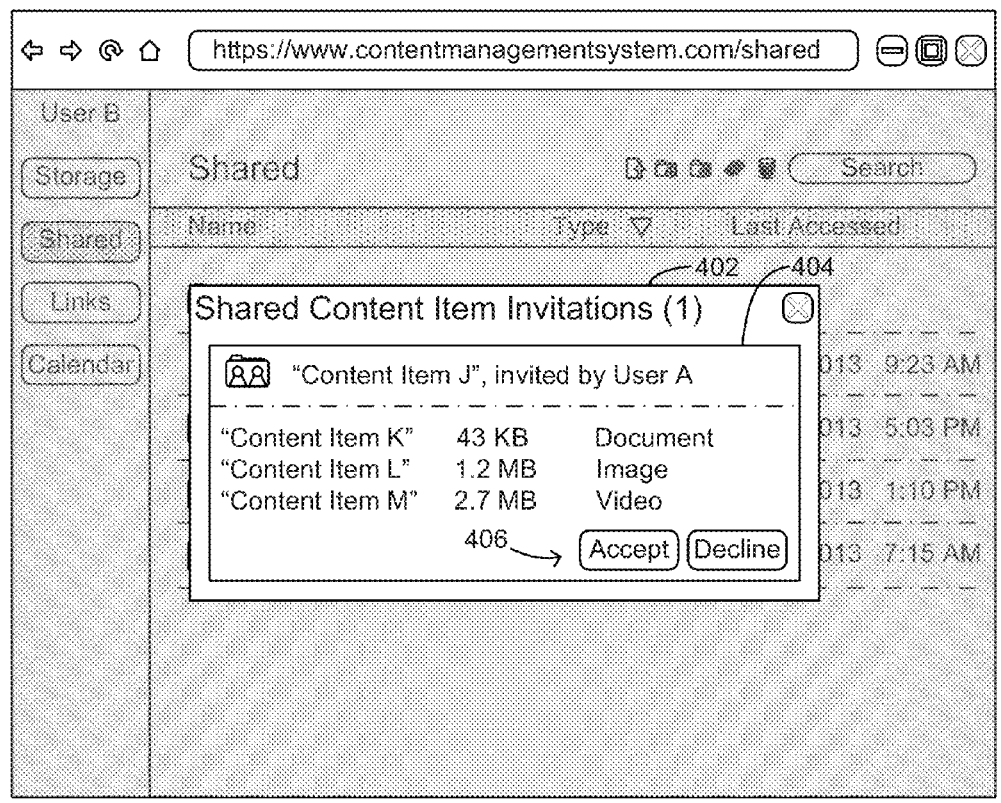
FIG. 4 shows an exemplary web interface through which information about a shared content item can be provided.

FIG. 4 shows an exemplary web interface through which information about a shared content item can be provided. In some embodiments, a user of an online content management system (e.g., 106 in FIG. 1) can utilize a browsing (or navigational) application, such as a web browser, to access the online content management system. In one example, User B can utilize the browsing application to access a web interface (e.g., website) for the online content management system. In this example, the web interface can display window 402 (within an allowable time period from) when User A makes a request to share content with User B. Window 402 can include information 404 about shared Content Item J, which can allow User B to make a relatively more informed decision regarding whether to accept or decline 406 the shared content from User A.

In another example, a recipient user can be interacting with an email message (e.g., message 202 in FIG. 2) associated with content shared by a sharer via the content management system. In this example, the recipient user can click on a button, link, etc., (e.g., button 250 in FIG. 2) within the email message to cause the web browser to execute and navigate to the web interface for the content management system, which can display window 402 or otherwise provide information about the shared content to the recipient user.

In a further example, the recipient user can interact with an interactive element (e.g., button, link, clickable notification/window, etc.) provided by a client application (e.g., represented by icon 306 in FIG. 3A, represented by icon 350 in FIG. 3B and FIG. 3C). In this example, the interactive element provided by the client application can be associated with the content shared by the sharer via the content management system. The recipient user's interaction with the interactive element can cause the web browser to execute and navigate to the web interface for the content management system, which can display window 402 or otherwise provide information about the shared content to the recipient user.

Moreover, in some embodiments, when a sharer or other sharing member of a content item revises, edits, or otherwise modifies the shared content item before a recipient user accepts the share invite, the content management system can cause information about the revision, edit, or modification to be provided to the recipient user via the web interface. Therefore, providing information about shared content items via the web interface can also be a dynamic/real-time process.

Figure 5A:
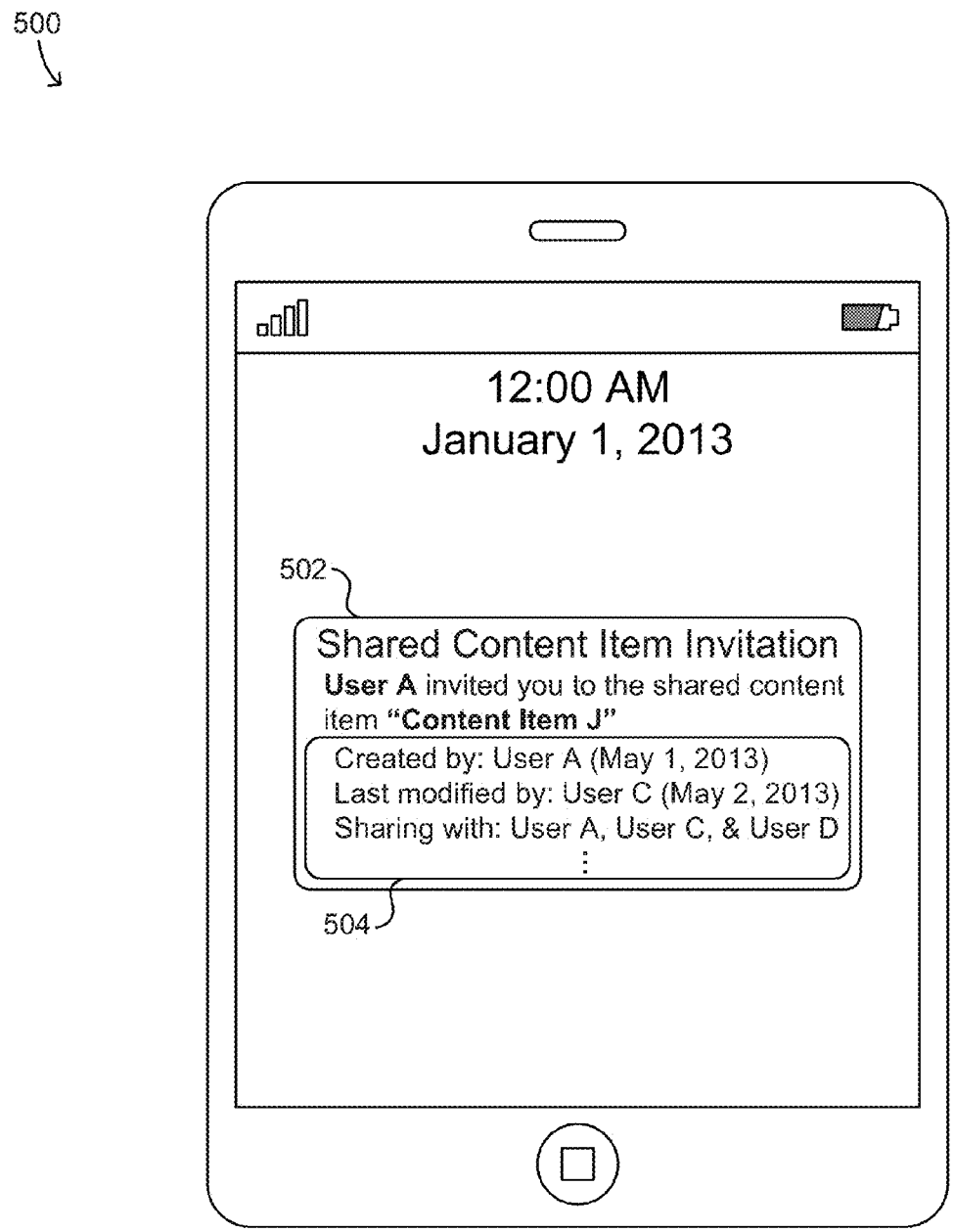
FIG. 5A shows an exemplary computing device embodiment at which information about a shared content item can be provided.

FIG. 5A shows an exemplary computing device embodiment at which information about a shared content item can be provided. In some embodiments, an application (i.e., app, mobile app, etc.) compatible with a content management system (e.g., 106 in FIG. 1) can be implemented on a mobile computing device (e.g., smartphone, tablet computer, etc.) of a recipient user, such as User B, as shown in FIG. 5A. In the example of FIG. 5A, exemplary computing device embodiment 500 can have installed the app configured to work in conjunction with the content management system. In some embodiments, exemplary computing device 500 can provide notification 502 to indicate that User A has shared a content item ("Content Item J") with User B. In some embodiments, exemplary computing device 500 can have implemented push notifications, such that notification 502 can be provided in substantially real-time.

In some embodiments, notification 502 can provide information 504 about the shared content item. Information 504 can allow User B to make a better decision regarding whether or not to access the shared content item by interacting with (e.g., clicking on, tapping at, swiping at, etc.) notification 502 or with the app for the content management system installed on device 500. However, in some embodiments, in order to save display space, reduce distraction, etc., information 502 about the shared content item need not be displayed within notification 502 and instead can be provided subsequently in response to an interaction with respect to notification 502.

Referring now to FIG. 5B and FIG. 5C, there can be an exemplary computing device embodiment at which information about a shared content item can be provided. Exemplary computing device embodiment 550 in FIG. 5B and FIG. 5C can be associated with User B and can implement an app for the content management system. In response to User A's invitation to User B regarding shared Content Item J, the app installed on device 550 can provide notification 552 specifying that User A has made the invitation to share Content Item J with User B, as shown in FIG. 5B. As discussed above, in some embodiments, information about shared Content Item J need not be presented with notification 552. Instead, User B can interact with notification 552 to cause the app to display interface 554 of FIG. 5C. Interface 554 can correspond to a graphical user interface (GUI) for the app for the content management system. Interface 554 can provide information 556 about the shared content item as well as an option 558 to accept or decline the share invitation.

In addition, similar to previous discussions, in some embodiments, providing information about a shared content item to a recipient user can performed dynamically and/or in real-time. As such, in some cases, information about modifications to the shared content item can be provided to the recipient user.

Figure 6:
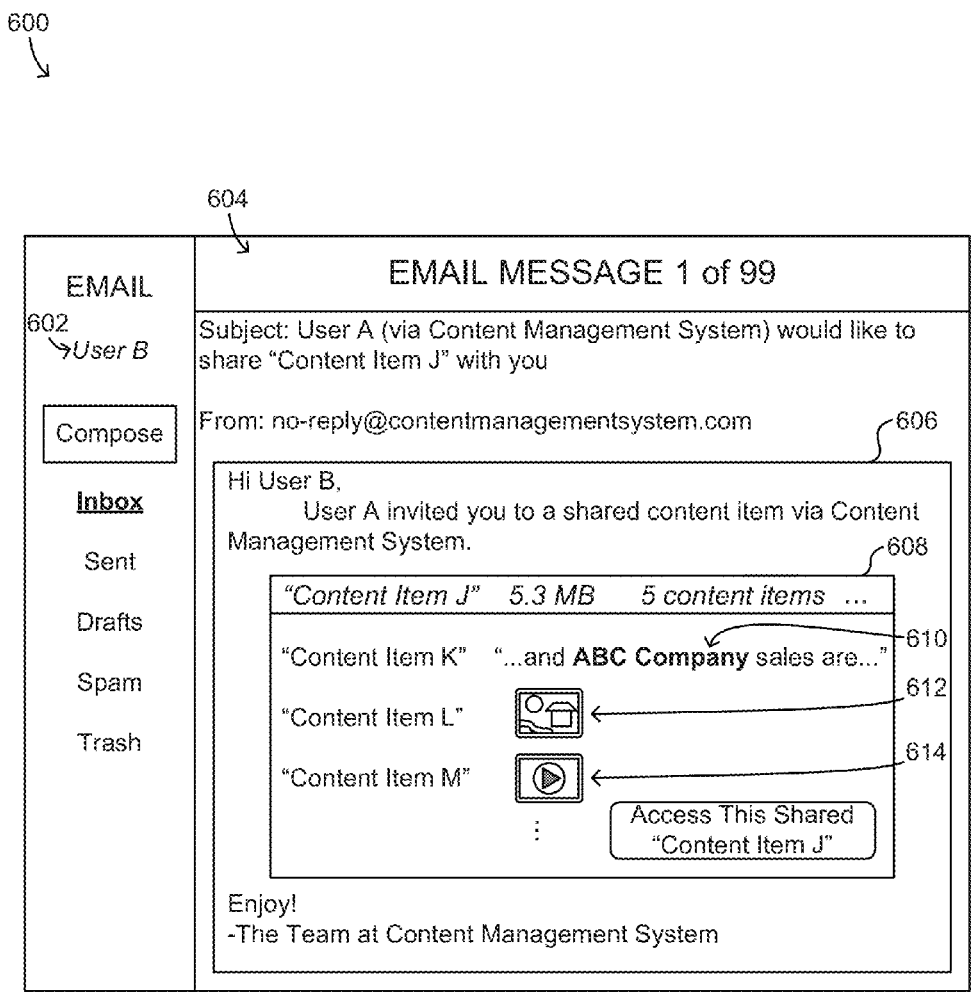
FIG. 6 shows an exemplary interface through which information about a shared content item can be provided.

Turning now to FIG. 6, FIG. 6 shows an exemplary interface through which information about a shared content item can be provided. In FIG. 6, exemplary email system interface 600 is shown as an example (for illustrative purposes only). A person of ordinary skill in the art would recognize that various other interfaces or approaches for providing information about shared content can be utilized as well.

In the example of FIG. 6, User B 602 can be logged into his email account, which can be associated with his account at the content management system. Exemplary email system interface 600 can receive and present email message 604 at User B's email account. Email message 604 can include message content 606. Email message content 606 can include a statement indicating that User A has shared a content item with User B 602. Further, message content 606 can provide information 608 about the shared content item ("Content Item J").

In some embodiments, information about a shared content item can include one or more properties, details, characteristics, etc., of the shared content item. In some embodiments, the information about the shared content item can include one or more representations of one or more content portions of the shared content item. With reference to FIG. 6, Content Item J can include sub-level Content Item K, sub-level Content Item L, and sub-level Content Item M. In other words, Content Item K, Content Item L, and Content Item M, can be shared content items within shared Content Item J. As such, information 608 about shared Content Item J can include information about shared sub-level Content Items K, L, and M.

In the example of FIG. 6, Content Item K can have at least some text content portions, and thus information 610 about Content Item K can include a "snippet" of text that is present in Content Item K. In other words, the snippet of text can correspond to a representation of a text content portion included in Content Item K. The representation of the text content portion (e.g., snippet of text) for Content Item K can include at least one keyword present within Content Item K. In some embodiments, the content management system can analyze Content Item K to identify the at least one keyword (or key phrase, key characters, etc.). For example, the content management system can analyze Content Item K to determine a level of relevancy with respect to at least one sequence of characters (e.g., key word, key phrase, etc.) present in Content Item K. In other words, the content management system can analyze a content item to determine whether or not there are any words, phrases, and/or strings of characters that might be sufficiently relevant (e.g., sufficiently important, significant, useful, etc.).

In some embodiments, the content management system can take into consideration the uniqueness of a particular word (or phrase, string of characters, etc.) with respect to other words, phrases, etc., in the content item. Additionally or alternatively, the content management system can take into consideration how often a particular word (or phrase, string, etc.) appears with respect to content items associated with a particular user. Moreover, the content management system can take into consideration whether or not a particular word is a proper noun, highlighted, bolded, underlined, italicized, or otherwise emphasized. A person of ordinary skill in the art would recognize various other factors and/or approaches to identifying key words, phrases, or characters within a content item. Based on these analyzes (separately or in combination) and/or other considerations, the content management system can identify at least one sequence of characters (e.g., key word, key phrase, etc.) when the level of relevancy with respect to the at least one sequence of characters at least meets a relevancy threshold.

Referring back to the example involving shared Content Item K, the content management system can identify the key phrase "ABC Company" as being likely sufficiently relevant. The key phrase "ABC Company" can be provided as information 610 about shared Content Item K. In some instances, the at least one keyword can be emphasized. Further, in some instances, the at least one key word, phrase, etc., can be provided in conjunction with one or more surrounding words or characters in the context of the at least one keyword. As such, a content portion representation (e.g., snippet of text) for shared Content Item K can be " . . . and ABC Company sales are . . . ". The content portion representation can enable User B to make a better decision regarding whether or not to accept the share invitation from User A.

In some embodiments, the content portion representation (e.g., snippet of text) that is provided or displayed to the recipient user can correspond to a recently edited text portion. For example, if the sharer or other sharing member of a content item adds a sentence to (a text portion of) the content item, then the added sentence (or at least a portion thereof) can be included in the content portion representation and be presented or displayed.

In another example, Content Item L can be an image content item or can include at least an image content portion. As such, information 612 about Content Item L can include an image representation of the image content present in Content Item L. As shown in FIG. 6, the image representation for Content Item L can correspond to a thumbnail image. In a further example, Content Item M can be a video content item or can include at least a video content portion. Thus, information 614 about Content Item M can include a video representation of the video content present in Content Item M. In some cases, the video representation for Content Item M can correspond to a down-sampled video portion or other sampled animation (e.g., GIF image) of the full-length video content of Content Item M.

Although not shown in FIG. 6, there can be other suitable representations for other content types. For example, when a content item or content portion is associated with audio, an audio sample can be used as the representation for the audio content.

It is also contemplated that the information about the shared content item can include one or more properties/details about the shared content item, one or more content portions of the shared content item, and/or other data about the shared content item. In other words, the information about the shared content item can include properties of the shared content item, content portions of the shared content item, data representations of the shared content item, or any combination thereof.

Figure 7:
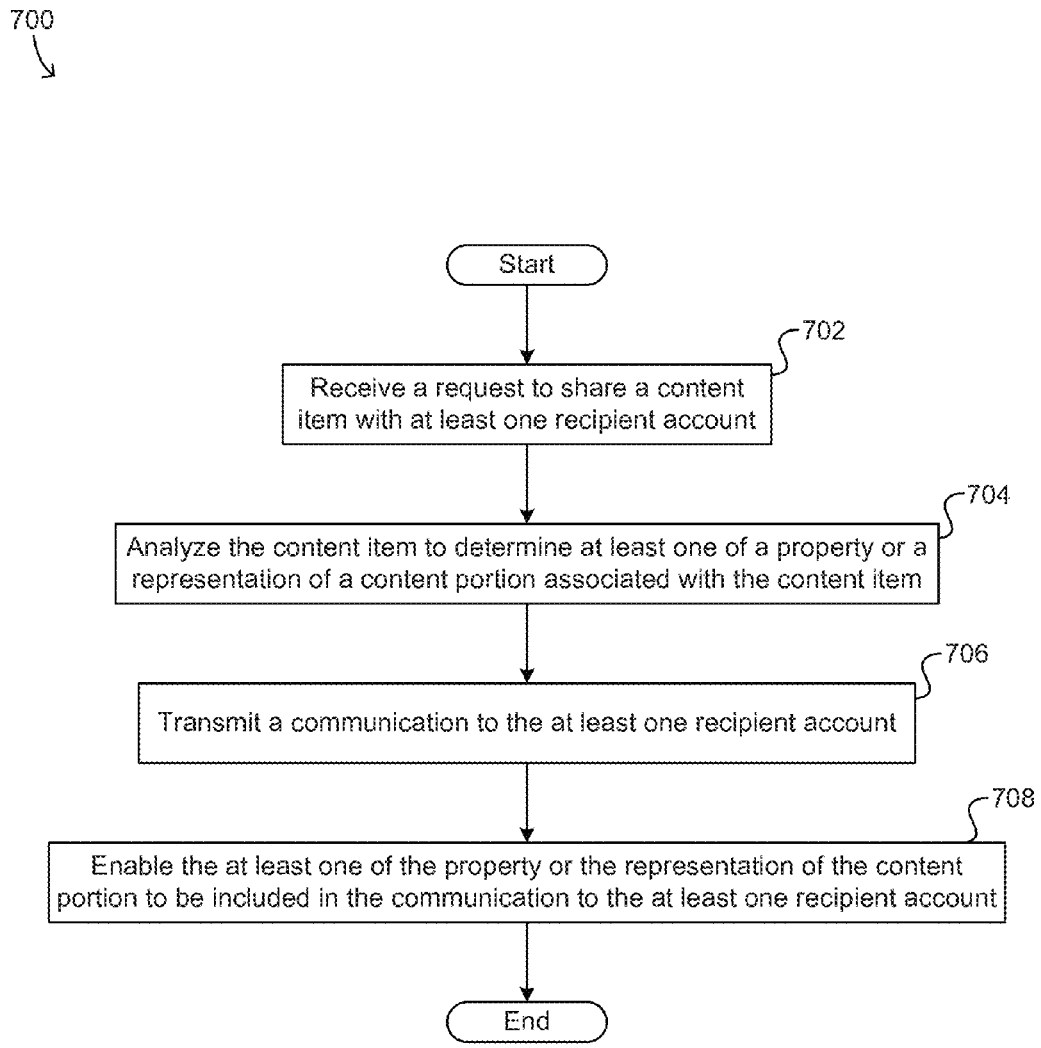
FIG. 7 shows an exemplary method embodiment for providing information for shared content.

FIG. 7 shows an exemplary method embodiment for providing information for shared content. It should be understood that there can be additional, fewer, or alternative steps performed in similar or alternative orders, or in parallel, within the scope of the various embodiments unless otherwise stated. Exemplary method embodiment 700 can receive a request to share a content item with at least one recipient account, at step 702. The request can be from a sharer account associated with the content item. In some cases, sharing the content item can provide read and write access of the content item to the at least one recipient account. The sharer account and the at least one recipient account can be associated with an online content management system.

At step 704, exemplary method 700 can analyze the content item to determine at least one of a property or a representation of a content portion associated with the content item. In some embodiments, one or more properties and/or representations can be determined. Step 706 can include transmitting a communication to the at least one recipient account. In some embodiments, the communication can indicate that the sharer account has requested to share the content item with the at least one recipient account. Then method 700 can enable the at least one of the property or the representation of the content portion to be included in the communication to the at least one recipient account, at step 708. The at least one of the property or the representation can enable the at least one recipient account to make a better decision regarding whether to accept or decline the shared content item.

Figure 8:
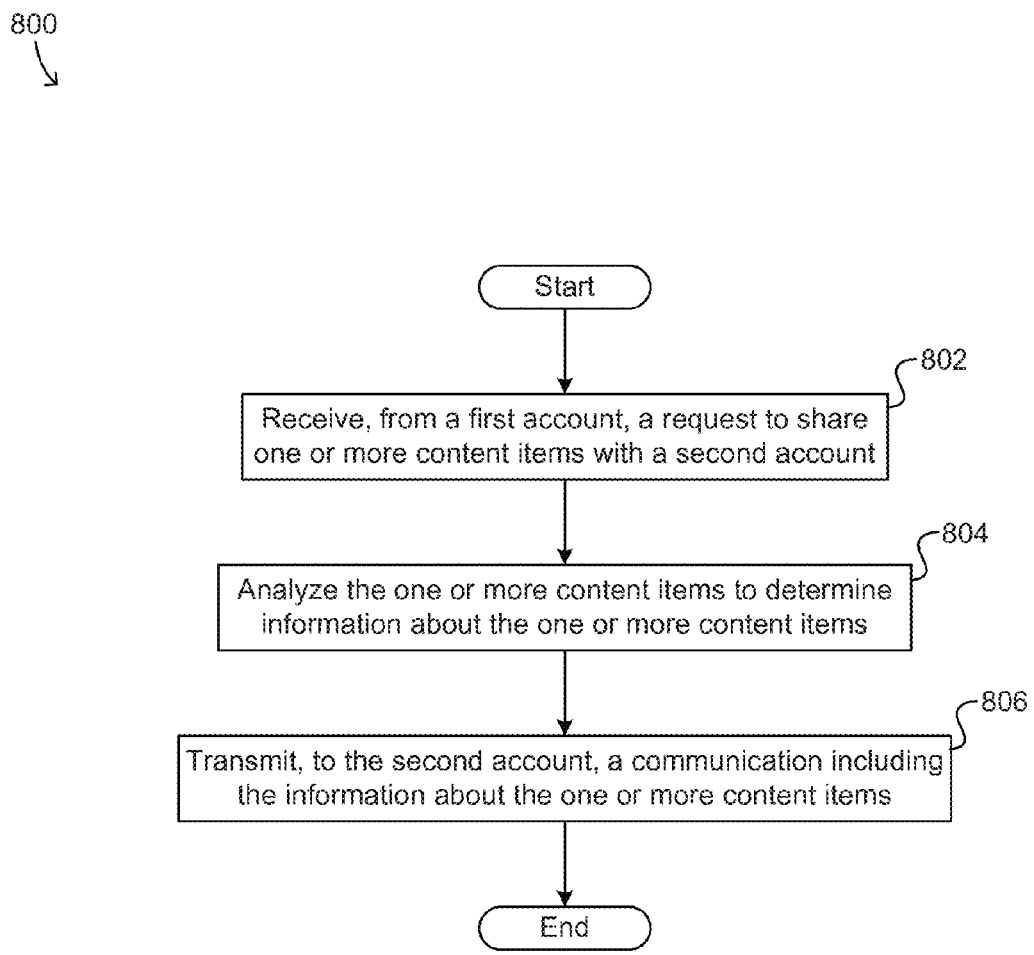
FIG. 8 shows an exemplary method embodiment for providing information for shared content.

FIG. 8 shows an exemplary method embodiment for providing information for shared content. As previously mentioned, it should be understood that there can be additional, fewer, or alternative steps performed in similar or alternative orders, or in parallel, within the scope of the various embodiments unless otherwise stated. Exemplary method embodiment 800 can receive, from a first account associated with one or more content items, a request to share the one or more content items with a second account, at step 802. The first account and the second account can be associated with an online content management system.

At step 804, exemplary method 800 can analyze the one or more content items to determine information about the one or more content items. The information can include at least one of a property or a representation of a content portion associated with the one or more content items. Step 806 can include transmitting, to the second account, a communication including the information about the one or more content items. In some embodiments, the communication can also indicate that the first account has requested to share the one or more content items with the second account.

Figure 9:
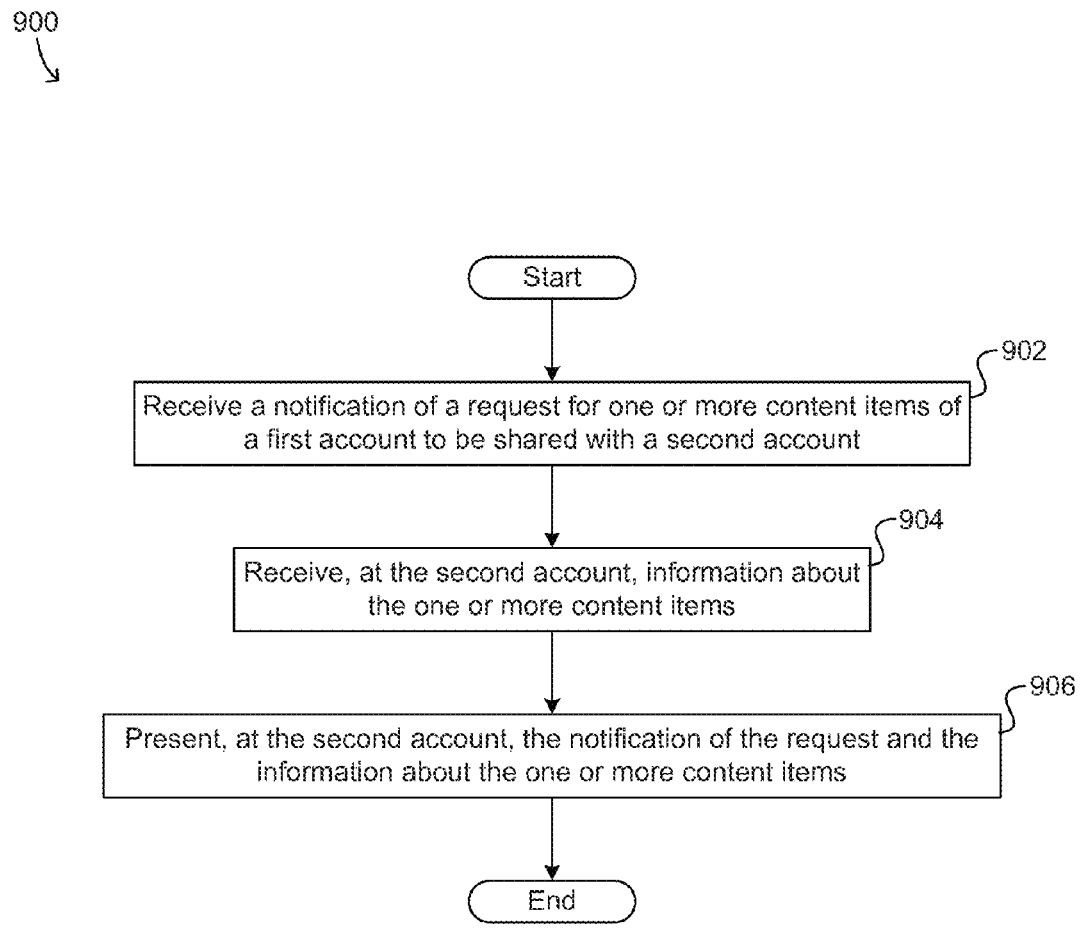
FIG. 9 shows an exemplary method embodiment for providing information for shared content.

FIG. 9 shows an exemplary method embodiment for providing information for shared content. Again, it should be understood that there can be additional, fewer, or alternative steps performed in similar or alternative orders, or in parallel, within the scope of the various embodiments unless otherwise stated. At step 902, exemplary method embodiment 900 can receive a notification of a request for one or more content items to be shared with a second account of an online content management system. The one or more content items can be associated with a first account of the online content management system. The notification can be received from the online content management system.

At step 904, method 900 can receive, at the second account, information about the one or more content items. The information can include at least one of a property or a representation of a content portion associated with the one or more content items. Step 906 can include presenting, at the second account, the notification of the request and the information including the at least one of the property or the representation of the content portion. Furthermore, in some embodiments, method 900 can also present an option to access the one or more content items being shared with the second account.

In some embodiments, information about one or more shared content items includes one or more properties of the shared content items. This can include at least one of an identifier for an author of each content item of the one or more shared content items, data indicating when each content item was created, an identifier for a last modifier of each content item, data indicating when each content item was last modified, a identifier for each content item, a size of each content item, an identifier for another account with which the one or more content items are shared, a quantity of one or more sub-level content items within each content item, an identifier for each sub-level content item of the one or more sub-level content items, a size for each sub-level content item, a content type for each sub-level content item, an identifier for an author of each sub-level content item, data indicating when each sub-level content item was created, an identifier for a last modifier of each sub-level content item, or data indicating when each sub-level content item was last modified.

In some embodiments, an option for the recipient user to download a local version of the shared content item can be presented. The local version can be a copy of the shared content item that is not synced among the shared members. Accordingly, modifications by the recipient user to the local version will not be updated or reflected with respect to the shared content item at the accounts of the other sharing members (e.g., the sharer and other recipients). Similarly, modifications to the shared content item by the other sharing members will not be updated or reflected with respect to the local version.

Furthermore, in some embodiments, if the recipient user chooses to download a local version of the shared content item, the recipient user can select which of the (sub-level) content items within the shared content item to download as local copies.

Various embodiments of the present technology can also implement a determination of a level of relevancy for shared content. In one example, a relevancy score for a shared content item can be calculated. The relevancy score can indicate how relevant the shared content item will likely be with respect to the recipient user. The relevancy score can be calculated, for example, based on analyzing content portions of the content item, data about the recipient user, activity of other recipient users of the content item, etc. In some cases, the relevancy score can be included in the information about the shared content item.

With reference now to FIG. 10A and FIG. 10B, FIG. 10A and FIG. 10B show exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for providing information for shared content, comprising:
   at least one processor;
   one or more non-transitory computer readable media; and
   computer readable instructions, stored on the one or more non-transitory computer readable media, that when executed by the at least one processor, cause the system to:
   receive, from a sharer account associated with a content item, a request to share the content item with at least one recipient account, wherein sharing the content item provides read and write access of the content item to the at least one recipient account, and wherein the sharer account and the at least one recipient account are associated with an online content management system;
   analyze the content item to determine at least one of a property or a representation of a content portion associated with the content item, wherein analyzing further includes determining a relevancy score of a segment of the of the content item, and identifying the segment of the content item as the representation of a content portion based on the relevancy score;
   transmit a communication to the at least one recipient account, the communication indicating that the sharer account has requested to share the content item with the at least one recipient account; and
   enable the at least one of the property or the representation of the content portion to be included in the communication to the at least one recipient account.

2. The system of claim 1, wherein the computer readable instructions further cause the system to:
   provide an option for the at least one recipient account to access the content item.

3. The system of claim 1, wherein the communication is provided to the at least one recipient account via at least one of an email message, an application configured to work in conjunction with the content management system, or a navigation application running on a computing device associated with the at least one recipient account.

4. The system of claim 1, wherein the property further includes at least one of a name for a user account who created the content item, a time indicating when the content item was created, a name for a user account who last modified the content item, a time indicating when the content item was last modified, a name for the content item, a size of the content item, a quantity of sub-level content items within the content item, a name for each of the sub-level content items, a size for each of the sub-level content items, a content type for each of the sub-level content items, a name for another user account with which the content item is shared, a name for a user account who created each of the sub-level content items, a time indicating when each of the sub-level content items was created, a name for a user account who last modified each of the sub-level content items, or a time indicating when each of the sub-level content items was last modified.

5. The system of claim 1, wherein the representation of the content portion includes at least one of a thumbnail when the content portion is associated with an image, a video sample when the content portion is associated with a video, an audio sample when the content portion is associated with an audio, or at least one keyword when the content portion is associated with a text content item.

6. The system of claim 5, wherein analyzing the content item further includes determining the relevancy score with respect to at least one sequence of characters included in the content item, and wherein the computer readable instructions further cause the system to:
   identify the at least one keyword as being the at least one sequence of characters when the level of relevancy with respect to the at least one sequence of characters at least meets a relevancy threshold.

7. The system of claim 5, wherein the representation of the content portion further includes one or more words surrounding the at least one keyword when the content portion is associated with the text content item.

8. A computer-implemented method, comprising:
   receiving, from a first account associated with one or more content items, a request to share the one or more content items with a second account, the first account and the second account being associated with an online content management system;
   analyzing the one or more content items to determine information about the one or more content items, the information including at least one of a property or a representation of a content portion associated with the one or more content items;
   determining a relevancy score for each of the one or more content items, wherein the information about the one or more content items includes the relevancy score for each of the one or more content items; and
   transmitting, to the second account, a communication indicating that the first account has requested to share the one or more content items with the second account, wherein the communication includes the information about the one or more content items.

9. The computer-implemented method of claim 8, wherein determining the relevancy score for each of the one or more content items is based, at least in part, on one or more levels of activity associated with the one or more content items, each level of activity being associated with a respective content item of the one or more content items.

10. The computer-implemented method of claim 8, wherein the property includes at least one of an identifier for an author of each content item of the one or more content items, data indicating when each content item was created, an identifier for a last modifier of each content item, data indicating when each content item was last modified, an identifier for each content item, a size of each content item, an identifier for another account with which the one or more content items are shared, a quantity of one or more sub-level content items within each content item, an identifier for each sub-level content item of the one or more sub-level content items, a size for each sub-level content item, a content type for each sub-level content item, an identifier for an author of each sub-level content item, data indicating when each sub-level content item was created, an identifier for a last modifier of each sub-level content item, or data indicating when each sub-level content item was last modified.

11. The computer-implemented method of claim 8, wherein the representation of the content portion includes at least one of a thumbnail when the content portion is associated with an image, a video sample when the content portion is associated with a video, an audio sample when the content portion is associated with an audio, or at least one keyword when the content portion is associated with a text content item.

12. The computer-implemented method of claim 11, wherein analyzing the one or more content items includes determining the relevancy score with respect to at least one sequence of characters included in the one or more content items, and wherein the method further comprises:
   identifying the at least one keyword as being the at least one sequence of characters based, at least in part, on determining that the level of relevancy with respect to the at least one sequence of characters satisfies a relevancy threshold.

13. The computer-implemented method of claim 11, wherein the representation of the content portion further includes one or more words surrounding the at least one keyword when the content portion is associated with the text content item.

14. The computer-implemented method of claim 8, wherein the information about the one or more content items is determined within an allowable time period from when the second account attempts to interact with at least one of the communication or the one or more content items.

15. A non-transitory computer-readable medium storing computer executable instructions for causing a computing system to perform a method comprising:
   receiving, from an online content management system, a notification of a request for one or more content items associated with a first account of the online content management system to be shared with a second account of the online content management system;
   receiving, at the second account, information about the one or more content items, the information including at least one of a property or a representation of a content portion associated with the one or more content items;
   determining a relevancy score for each of the one or more content items, wherein the information about each of the one or more content items includes the relevancy score for each of the one or more content items, wherein the relevancy score indicates relevancy of the one or more content items with respect to the second account; and
   presenting, at the second account, the notification of the request, the information including the at least one of the property or the representation of the content portion, and an option to access the one or more content items being shared with the second account.

16. The non-transitory computer-readable medium of claim 15, wherein the one or more content items are to be shared with a set of accounts including the first account and the second account, and wherein the method further comprises:
   downloading, at the second account, the one or more content items from the online content management system when the option to access the one or more content items has been selected; and
   receiving read and write access permissions, at the second account, with respect to the one or more content items, wherein the one or more content items are synced the set of accounts.

17. The non-transitory computer-readable medium of claim 16, wherein the one or more content items are synched with the set of accounts such that a modification to the one or more content items by the second account will be updated at the set of accounts and a modification to the one or more content items by an account of the set of accounts will be updated at least at the second account.

18. The non-transitory computer-readable medium of claim 15, wherein the method further comprises:
   presenting, at the second account, an option to download a local representation of at least a portion of the one or more content items at a time when the local representation is downloaded.

19. The non-transitory computer-readable medium of claim 18, wherein the at least the portion of the one or more content items is selectable at the second account.

* * * * *